UNITED STATES PATENT OFFICE.

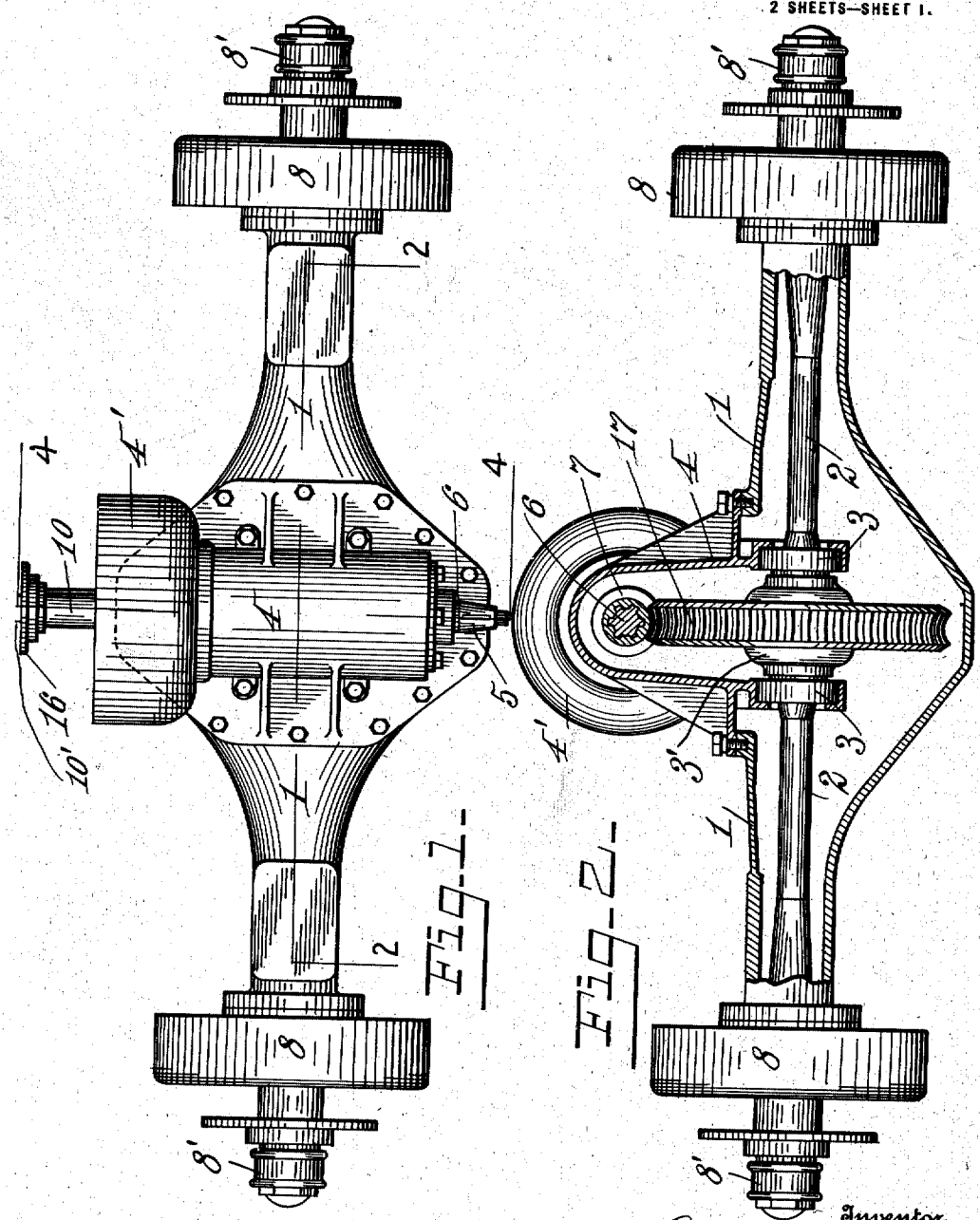

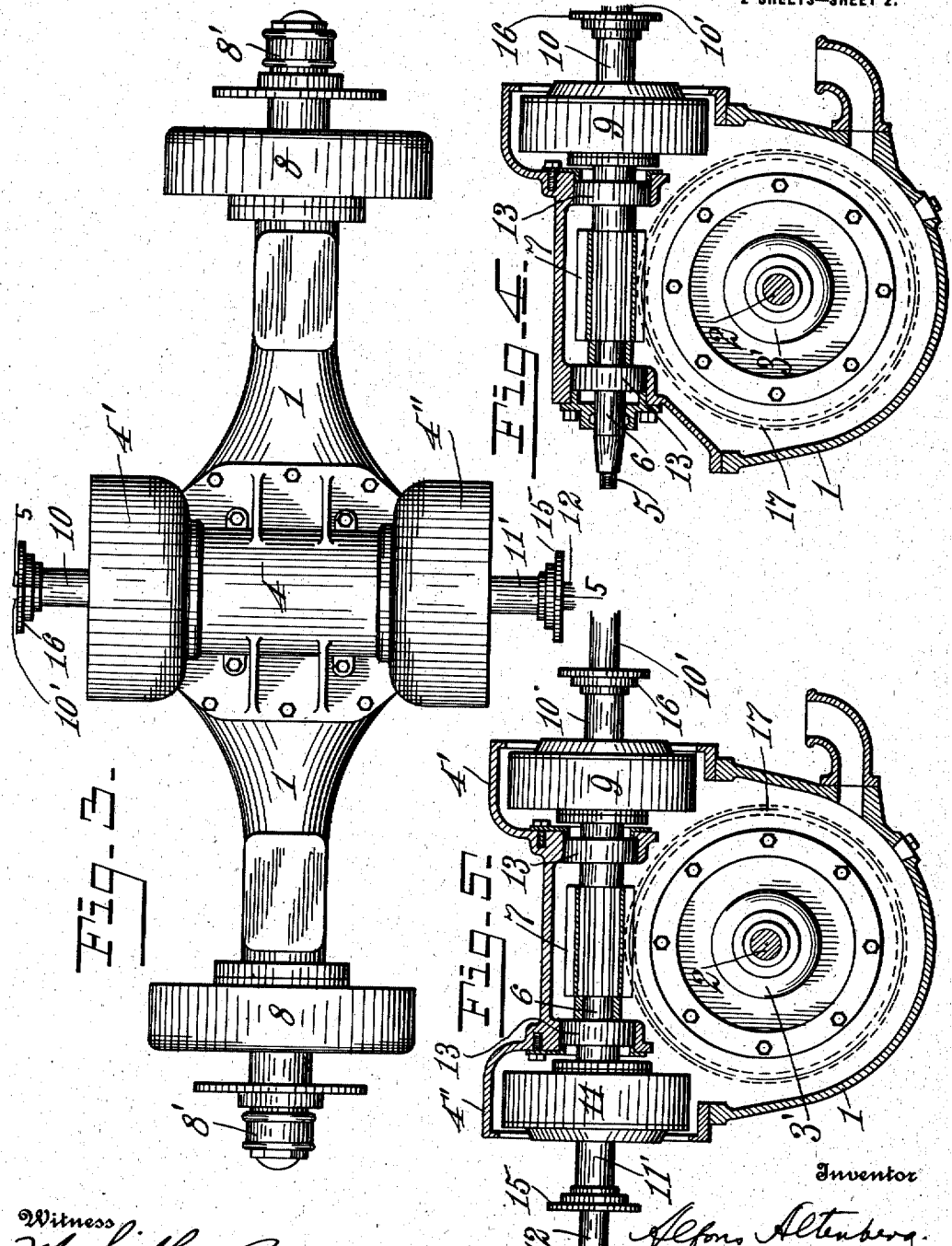

ALFONS ALTENBERG, OF PIQUA, OHIO.

REAR-AXLE DRIVING MECHANISM FOR AUTOMOBILES.

1,255,271. Specification of Letters Patent. Patented Feb. 5, 1918.

Application filed March 23, 1917. Serial No. 156,881.

*To all whom it may concern:*

Be it known that I, ALFONS ALTENBERG, a citizen of the United States, residing at Piqua, in the county of Miami and State of Ohio, have invented certain new and useful Improvements in Rear-Axle Driving Mechanism for Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in the rear axle of automobile trucks. The object of the invention is to provide means for utilizing the power generated by the engine of the motor truck for the purpose of other work, for example, for operating some other machine in the rear thereof when the motor truck is running, and for furnishing power for other machines connected in front of the rear axle when the motor truck is stationary. As an illustration, in driving machines for various repair work, in which case the power of the engine is entirely cut off from the rear axle of the motor truck but not from the rear auxiliary driving shaft. These results are accomplished by the addition of one or two auxiliary drive shafts and one or two clutches through which power may be transmitted from the engine to the other machines to be operated from the power generated thereby, as will be hereinafter more clearly described in connection with the accompanying drawings.

Referring to the accompanying drawings, Figure 1 is a top plan view of the rear axle casing and allied parts. Fig. 2 is a sectional view of the same on the line 2—2 of Fig. 1. Fig. 3 is a plan view of a modification of the rear axle showing means for permitting power to be taken off the propeller and auxiliary shaft. Fig. 4 is a sectional view on the line 4—4 of Fig. 1, and Fig. 5 is a sectional view on the line 5—5 of Fig. 3. In a detail description of the invention similar reference characters indicate corresponding parts in the several views of the drawings.

1 designtes the casing in which the differential and transmission gearing is mounted. The rear axle 2 of the truck lies within this casing and has proper bearings 3—3 therein. The said casing has an upper cap 4 bolted thereto which furnishes alined bearings 13—13 for the transmission shaft 6 the end 5 of which is connected to the engine through the service clutch and transmission gear thereof (not shown) in a well known manner. The cap 4 has on one end as shown in Fig. 1 a clutch housing 4' and on the other end as shown in Figs. 3 and 5 a clutch housing 4''. These housings inclose clutch members through which transmission shafts are driven, as will be presently described. The rear axle 2 has a worm wheel 17 rigidly mounted therein between the bearings 3—3 of said axle 2 and which is in mesh with a worm gear 7 on the worm gear shaft 6, said worm gear 7 lying between the two bearings 13—13 on the interior of the cap 4. Also between the bearings 3—3 on the rear axle 2 are the differential gears which are inclosed in the gear casing 3'. It will be understood that forms of gearing might be employed for driving the rear axle 2 other than the form of worm gearing described. In the drawings, however, I show a well known form of spiral or worm gearing. The axle 2 is provided with the usual brake drums 8 and hub caps 8'. As shown in Figs. 1 and 4 the shaft 6 which as before stated is driven from the engine shaft through a propeller shaft and is provided with a clutch 9 by means of which an auxiliary rearward drive shaft 10' may be coupled and thus the power generated from the engine may be transmitted to other machines to be driven, such for example as a street sweeping machine, a ground roller, or any other type of machine may be thus driven from the shaft 10' through the intervention of the clutch 9. The clutch members 9 may be of any well known type of clutch, one member of which has a sleeve 10 which is actuated with reference to the other member of the clutch by actuating means 16 which intervene between the clutch and the rearward driven shaft 10'. The shaft 10' it will be understood extends rearward of the truck, and any of the well known forms of clutches may be utilized for effecting a connection and disconnection between the shafts 6 and 10'. As shown in Fig. 5 an additional clutch 11 is arranged forward of the rear axle for the purpose of disconnecting the propeller shaft 12 from the axle and from which power may be transmitted for other purposes than that which is transmitted through the auxiliary drive shaft 10'. The clutch members 11 are similar to the clutch members described in connection with the rearward auxiliary drive shaft 10', one member thereof having a sleeve 11' and actuating means 15 which intervene between the sleeve member 11' and the propeller shaft 12. By means of the clutch members 11 the power may be cut off from both the rear truck axle 2 and the rear transmission shaft 10' and the engine power applied wholly to the propeller drive shaft 12. The power thus generated by the engine may be diverted for any use other than that of driving the rear axle 2 of the motor truck. By the means shown and described the power generated by the engine may be conveniently utilized for a variety of purposes other than its well known use for propelling the motor truck.

Having described my invention, I claim:

1. The combination with the rear axle of a motor truck, differential gears thereon, a gear thereon for driving said rear axle, an engine driven transmission shaft geared to the driving gear of said rear axle, of an auxiliary drive shaft in the rear of said truck axle, and a clutch mounted in the rear of said axle and forming a power transmission medium between the driving shaft for said rear axle and the auxiliary drive shaft.

2. The combination with the rear axle of a motor truck, the differential gears thereon, a gear thereon through which said rear axle is driven, and a power transmission shaft geared to said axle driving gear, of an auxiliary drive shaft adapted to transmit power from said first-named transmission shaft to a machine to be driven in the rear of the truck, and a clutch in the rear of said axle for connecting and disconnecting said auxiliary drive shaft to and from said first-named shaft.

3. In a driving gear for automobile trucks, the combination with a rear truck axle, differential gears thereon, a gear thereon for driving said rear axle, a drive shaft geared to said driving gear and adapted to be driven by an engine-driven propeller shaft on one side thereof, an auxiliary shaft on the other side, and clutches mounted at the ends of said drive shaft and interposed between said auxiliary shaft, said propeller shaft and said drive shaft, whereby the power from the engine may be taken off the propeller shaft, may be transmitted to the rear axle, or taken off the auxiliary shaft.

4. The combination of the rear axle of a motor truck, the differential gears and driving gear thereof, an engine driven shaft geared to said driving gear, an auxiliary drive shaft, a clutch for connecting and disconnecting said auxiliary drive shaft to and from said engine driven shaft, said rear axle, and the differential and driving gears thereof and said clutch being inclosed in the rear axle casing and a cap attached thereto, substantially as described.

5. In a driving gear for automobile trucks, the combination with a rear truck axle, differential gears thereon, a gear thereon for driving said rear axle, a drive shaft geared to said driving gear and adapted to be driven by an engine-driven propeller shaft on one side thereof, an auxiliary shaft on the other side, clutches mounted at the ends of said drive shaft and interposed between said auxiliary shaft, said propeller shaft and said drive shaft, whereby the power from the engine may be taken off the propeller shaft, may be transmitted to the rear axle, or taken off the auxiliary shaft, and a casing for said rear axle and clutches.

In testimony whereof I affix my signature, in presence of a witness.

ALFONS ALTENBERG.

Witness:
MATTHEW SIEBLER.